United States Patent
Blackman et al.

(10) Patent No.: US 6,360,229 B2
(45) Date of Patent: *Mar. 19, 2002

(54) GENERIC EXECUTION MODEL FOR ISOLATING APPLICATIONS FROM UNDERLYING DATABASES

(75) Inventors: Kenneth Ray Blackman, San Jose; Shyh-Mei Fang Ho, Cupertino; Thomas Beavers Sander, Saratoga, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,274

(22) Filed: Apr. 30, 1998

(51) Int. Cl.$^7$ .............................................. G06F 17/30
(52) U.S. Cl. ....................................................... 707/103
(58) Field of Search ........................................ 707/103

(56) References Cited

U.S. PATENT DOCUMENTS

| | | |
|---|---|---|
| 5,161,225 A | 11/1992 | Abraham et al. |
| 5,212,787 A | 5/1993 | Baker et al. |
| 5,291,583 A | 3/1994 | Bapat |
| 5,295,256 A | 3/1994 | Bapat |
| 5,297,279 A | 3/1994 | Bannon et al. |
| 5,303,379 A | 4/1994 | Khoyi et al. |
| 5,379,419 A | 1/1995 | Heffernan et al. |
| 5,414,812 A | 5/1995 | Filip et al. |
| 5,421,015 A | 5/1995 | Khoyi et al. |
| 5,426,747 A | 6/1995 | Weinreb et al. |
| 5,437,027 A | 7/1995 | Bannon et al. |
| 5,459,860 A | 10/1995 | Burnett et al. |
| 5,499,371 A | 3/1996 | Henninger et al. |
| 5,535,389 A * | 7/1996 | Elder et al. ..................... 717/11 |
| 5,542,078 A | 7/1996 | Martel et al. |
| 5,734,887 A * | 3/1998 | Kingberg ............................ 707/4 |
| 5,987,423 A * | 11/1999 | Arnold et al. .................. 705/14 |
| 6,014,637 A * | 1/2000 | Fell et al. ........................ 705/26 |
| 6,016,495 A * | 1/2000 | McKeehan et al. .......... 707/103 |
| 6,018,743 A * | 1/2000 | Xu .................................. 707/103 |
| 6,049,665 A * | 4/2000 | Branson et al. ............... 395/702 |

OTHER PUBLICATIONS

Muckenhaupt, Kenneth J., "Preserving Current Asssets With Objects on MVS White Paper," Mar. 15, 1996, at http://www.s390.ibm.com/producst/wp/wrapwp.html.

IBM Corporation. "IMS in an Object Oriented World," San Jose, California, Jul. 12, 1995, pp. 1–53.

Howe III, Jack L., "IMS/OO—Overview: Objects in IMS Are Closer Than They Appear", IBM Corporation, Overheads from presentation at SHARE '95, Feb. 23, 1995.

Howe III., Jack L., "Objects in the IMS are Closer Than They Appear", IBM Corporation, Overheads from presentation at IBM Technical Interchange '95, May 20, 1995.

"Voyager/C++ Client/Server Object Management System," Secant Technologies, Inc., 1995.

Ho, Shyh–Mei, "Object Access To IMS Data," IMS OO–Web Design/Development, IBM Santa Teresa Laboratory, San Jose, California, Overheads from presentation at SHARE '97, Mar. 1997.

"Get your Objects with IMS Database Object Technology," IBM Corporation., 1995, pp. 1–3.

"Objects in IMS Are Closer Than They Appear,", IBM Corporation—IMS DBobject Services, Mar. 1, 1996.

"Object Collection Service," IBM Corporation, Feb. 9, 1996, pp. 1–134.

* cited by examiner

*Primary Examiner*—Wayne Amsbury

(57) ABSTRACT

A method, apparatus, and article of manufacture for accessing a database. The database is modeled as an objects framework having zero or more business objects and one or more data objects. The data objects represent data in the database and the business objects represent logic for operating on the data objects.

36 Claims, 3 Drawing Sheets

GENERIC EXECUTION MODEL FOR ISOLATING APPLICATIONS FROM UNDERLYING DATABASES

CROSS-REFERENCE TO RELATED APPLICATIONS

This application is related to the following co-pending and commonly-assigned patent applications:

Utility Application Ser. No. 09/070,071, entitled "AN EXECUTION PARADIGM FOR ACCESSING HIERARCHICAL DATA USING AN OBJECT FRAMEWORK," filed on same date herewith, by Kenneth R. Blackman, Shyh-Mei F. Ho, and Thomas Beavers Sander, now U.S. Pat. No. 5,924,101;

Utility Application Ser. No. 09/070,528, entitled "AN OBJECT-ORIENTED PROGRAMMING MODEL FOR ACCESSING HIERARCHICAL DATABASES," filed on same date herewith, by Bach D. Doan and Shyh-Mei F. Ho, now pending;

Utility Application Ser. No. 09/070,273, entitled "AN INTERNET-ENABLED GENERIC APPLICATION PROGRAM FOR ACCESSING HIERARCHICAL DATA," filed on same date herewith, by Bach D. Doan and Shyh-Mei F. Ho, now U.S. Pat. No. 6,128,611;

Utility Application Ser. No. 09/070,273, entitled "GENERATING AN INTERNET APPLICATION FOR ACCESSING A HIERARCHICAL DATABASE," filed on same date herewith, by Attila J. Fogarasi, Shyh-Mei F. Ho, Wai-Lee D. Ling, and Kevin M. McBride, now U.S. Pat. No. 6,128,619;

Provisional Application Ser. No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson;

Utility Application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, which claims the benefit under 35 U.S.C. §119(e) of Provisional Application Ser. No. 60/067,292 above now U.S. Pat. No. 6,128,622;

Utility Application Ser. No. 08/949,638, entitled "A USER INTERFACE FOR CREATING CLASS DEFINITIONS AND IMPLEMENTATIONS FOR DATABASE PERSISTENT OBJECTS," filed on Oct. 14, 1997, by Mark Alan Bach, Shyh-Mei F. Ho, Kevin Michael McBride, H. Moncrief Rowe-Anderson and Thomas Beavers Sander, now U.S. Pat. No. 5,924,101, Utility Application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739;

Utility Application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313, Utility Application Ser. No. 08/736,763, entitled "A METHOD FOR REPRESENTING NON-OBJECT-ORIENTED DATABASES USING A COLLECTION OF COLLECTIONS DATA MODEL," filed on Oct. 25, 1996, by Kenneth R. Blackman and Jack L. Howe III, now U.S. Pat. No. 5,794,248;

Utility Application Ser. No. 08/738,294, entitled "A METHOD FOR THE INCREMENTAL PRESENTATION OF NON-OBJECT-ORIENTED DATABASES USING AN OBJECT-ORIENTED QUERYABLE DATABASE COLLECTION," filed on Oct. 25, 1996, by Kenneth R. Blackman and Jack L. Howe III, now U.S. Pat. No. 5,781,907;

Utility Application Ser. No. 08/738,104, entitled "A QUERY SYNTAX FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778,379;

Utility Application Ser. No. 08/738,082, entitled "A QUERY PARSER FOR ACCESSING NON-RELATIONAL, NON-OBJECT-ORIENTED DATABASES," filed on Oct. 25, 1996, by Kenneth R. Blackman and Jack L. Howe III, now U.S. Pat. No. 5,778,358;

Utility Application Ser. No. 08/738,330, entitled "A METHOD FOR USING A DATABASE CURSOR FOR THE INCREMENTAL PRESENTATION OF QUERY RESULTS WHEN TRAVERSING IMPLIED COLLECTIONS IN NON-OBJECT-ORIENTED DATABASES," filed on Oct. 25, 1996, by Kenneth R. Blackman and Jack L. Howe III, now U.S. Pat. No. 5,787,436;

Utility Application Ser. No. 08/736,759, entitled "A METHOD FOR REPRESENTING DATA FROM NON-RELATIONAL, NON-OBJECT-ORIENTED DATABASES AS QUERYABLE DATABASE PERSISTENT OBJECTS," filed on Oct. 25, 1996, by Kenneth R. Blackman and Jack L. Howe III, now U.S. Pat. No. 5,794,247;

Utility Application Ser. No. 08/736,764, entitled "A METHOD FOR ENCAPSULATING DATA FROM NON-OBJECT-ORIENTED DATABASES AS DATABASE PERSISTENT OBJECTS," filed on Oct. 25, 1996, by Kenneth R. Blackman and Jack L. Howe III, now U.S. Pat. No. 5,765,161;

Utility Application Ser. No. 08/738,103, entitled "A METHOD FOR USING QUERYABLE PERSISTENT IDENTIFIERS TO LOCATE DATA FOR DATABASE PERSISTENT OBJECTS IN NON-OBJECT-ORIENTED DATABASES," filed on Oct. 25, 1996, by Kenneth R. Blackman and Jack L. Howe III, now U.S. Pat. No. 5,765,163;

Utility Application Ser. No. 08/736,983, entitled "A METHOD FOR INTERFACING QUERYABLE DATABASE PERSISTENT OBJECTS TO NON-RELATIONAL, NON-OBJECT-ORIENTED DATABASES," filed on Oct. 25, 1996, by Kenneth R. Blackman and Jack L. Howe III, now U.S. Pat. No. 5,761,671;

Utility Application Ser. No. 08/736,952, entitled "A METHOD FOR MANAGING QUERYABLE DATABASE PERSISTENT OBJECTS AND QUERYABLE DATABASE COLLECTIONS IN AN OBJECT-ORIENTED ENVIRONMENT," filed on Oct. 25, 1996, by Kenneth R. Blackman and Jack L. Howe III, now U.S. Pat. No. 5,765,162;

Utility Application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597;

Utility Application Ser. No. 08/736,922, entitled "A METHOD FOR CATALOGING DATABASE CHARACTERISTICS AND DEFINING AND GENERATING DATABASE PERSISTENT OBJECTS," filed on Mar. 25,1998, by Kenneth R. Blackman and Jack L. Howe III, now U.S. Pat. No. 5,809,508, which is a continuation of Utility Application Ser. No. 08/736,765 above;

Utility Application Ser. No. 08/736,922, entitled "A METHOD FOR CAPTURING AND CATALOGING DATABASE CHARACTERISTICS TO DEFINE DATABASE PERSISTENT OBJECTS," filed on Oct. 25, 1996, by Kenneth R. Blackman and Jack L. Howe III, now U.S. Pat. No. 5,809,508;

Utility Application Ser. No. 08/738,102, entitled "A METHOD FOR CAPTURING AND CATALOGING SPECIFICATIONS FOR DATABASE PERSISTENT CLASSES," filed on Oct. 25, 1996, by Kenneth R. Blackman and Jack L. Howe III, now U.S. Pat. No. 5,737,598;

Utility Application Ser. No. 08/738,105, entitled "A METHOD FOR USING A NON-OBJECT-ORIENTED DATABASE AS A GENERIC PERSISTENT DATABASE FOR PERSISTENT OBJECTS," filed on Oct. 25, 1996, by Kenneth R. Blackman and Jack L. Howe III, now U.S. Pat. No. 5,809,509; and Utility Application Ser. No. 08/736,761, entitled "A METHOD FOR CAPTURING AND CATALOGING PROGRAM CHARACTERISTICS FOR THE USAGE OF DATABASE PERSISTENT CLASSES," filed on Oct. 25, 1996, by Kenneth R. Blackman and Jack L. Howe III, now U.S. Pat. No. 5,764,979;

all of which applications are incorporated by reference herein.

BACKGROUND OF THE INVENTION

1. Field of the Invention

The present invention relates generally to computerized methods for accessing databases, and in particular, to a generic execution model for isolating application programs from the structure and operations of the underlying data.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrapping, implemented in such products such as IBM's VisualAge™ IMS Connection. Transaction wrappering creates a class having methods that retrieve data from the IMSTM database, create an object embodying the retrieved data, and manipulate the object in an object-oriented application program. The problem with this approach is that each object-oriented application requires substantial additional coding, both object-oriented and nonobject-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMST4 database, does not map well to a relational database.

Thus, there is a need in the art for improved techniques for accessing hierarchical data using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a database, wherein the database is modeled as an objects framework having zero or more business objects and one or more data objects. The data objects represent data in the database and the business objects represent logic for operating on the data objects.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention introduces a new model for accessing databases, such as an IMS™ database, by modeling the database into an objects framework and providing the mechanisms that allow object-oriented application programs to access the database data using standard tools, such as the DL/I™ query language for the IMS™ database. The objects framework instantiates IMS™ data objects upon demand from application programs and manages those objects from creation to deletion. Further, the objects framework uses these objects to dynamically construct DL/I™ calls from application program requests.

The objects framework can be used in a number of different environments, such as: (1) DL/I™ batch processing and (2) on-line transactions including both IMS™ and CICS™ transactions. Moreover, the objects framework can be executed in any MVS address space, including IMS™ and non-IMS™ address spaces, such as web server address spaces.

Thus, the present invention offers improved IMS™ application programming productivity by supporting IMS™ business objects and data objects, by eliminating complicated DL/I™ programming, and by supporting use of object-oriented programming tools.

Hardware Environment

Figure 1:
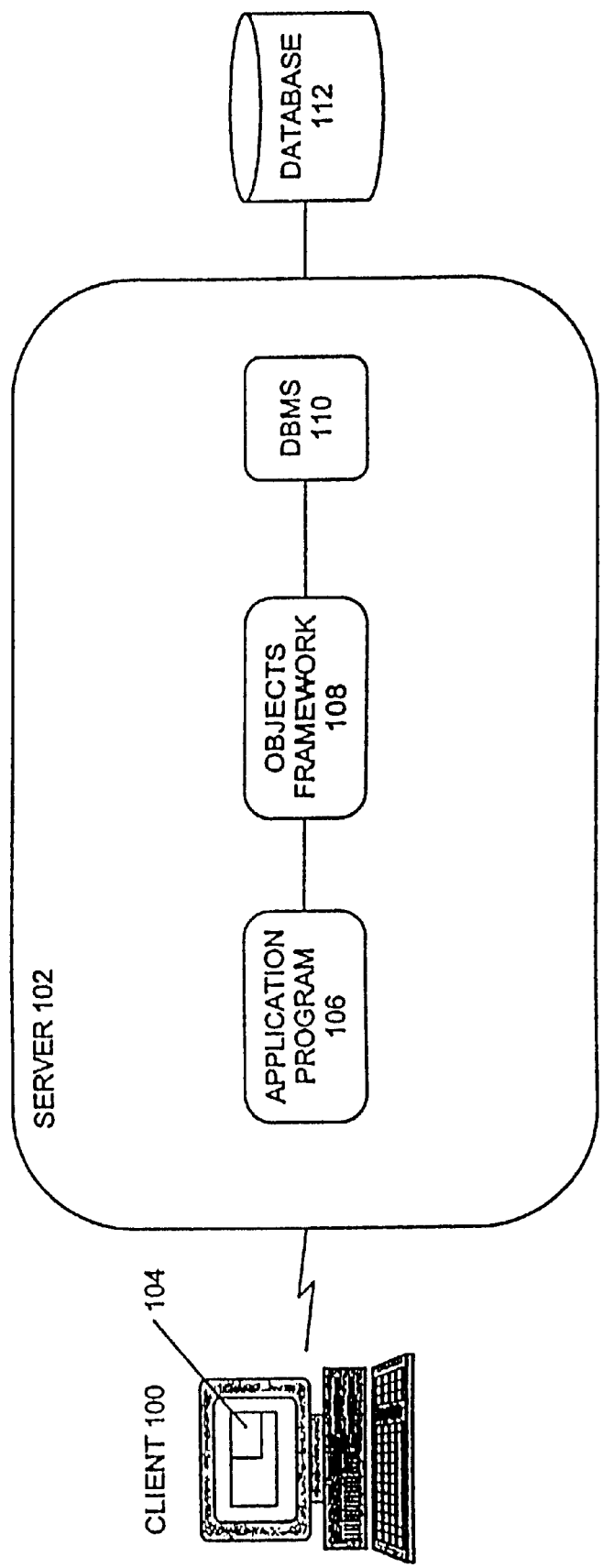
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBMS) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a data storage device, a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
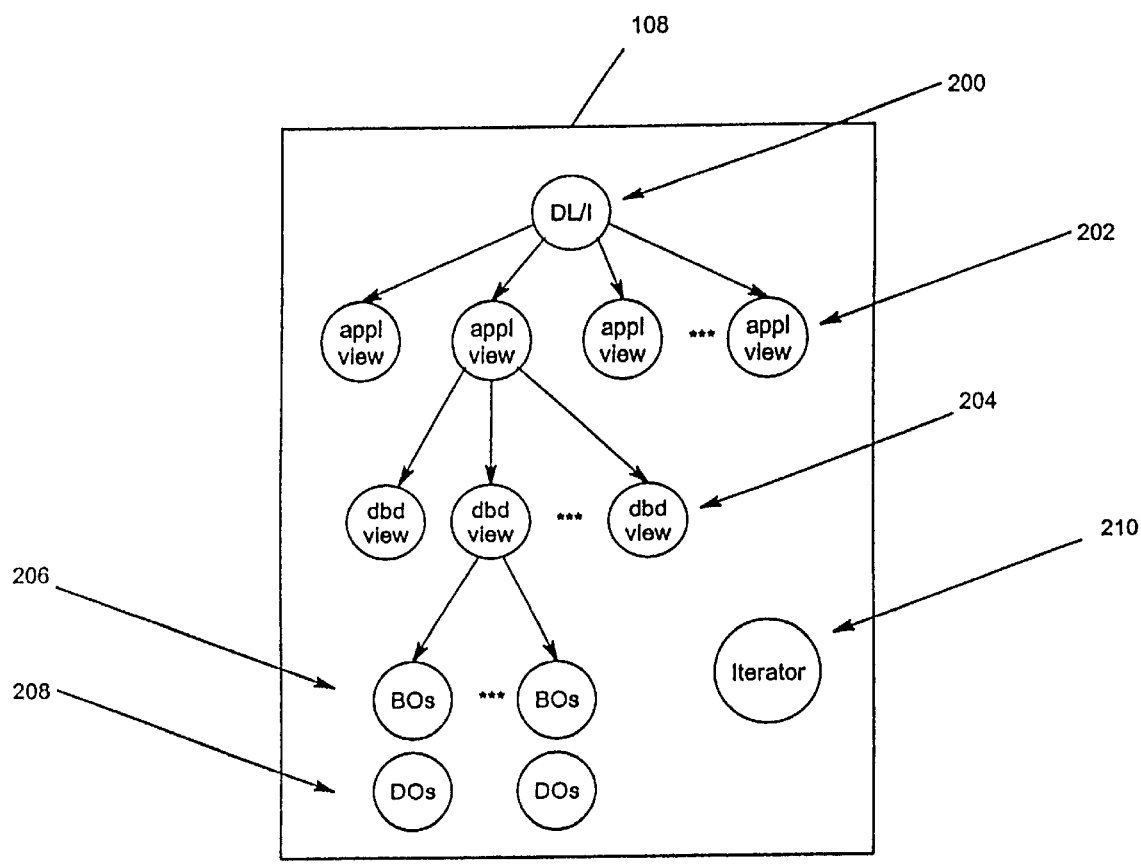
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system.

The objects framework 108 comprises a C++ class library that interfaces to the application program 106. The application program 106 dynamically loads previously-defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, and an iterator object 210.

The application program 106 first loads the objects framework 108 class library by instantiating the DL/I™ object 200, one applView object 202, and one dbdView object 204. The objects framework 108 then dynamically loads in the BO 206 and DO 208 class library requested by the application program 106 to create an iterator object 210, which then instantiates the BOs 206 and their corresponding DOs 208 during execution.

All the class objects, except the iterator class 210, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a BO 206 may be instantiated with a DO 208 to provide business logic for the application program 106. In such an embodiment, the application program 106 accesses the business logic via the BO 206, which in turns invokes the methods of its corresponding DO 208 to perform the necessary operations on the database 112, to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other nonhierarchical databases, e.g. DB2™.

Iterator Object

In the objects framework 108, the application program 106 uses a DL/I™ query string to access the IMS™ database 112. The application program 106 first instantiates a desired applView object 202. If the associated DL/I™ object 200 has not been instantiated yet, this also results in its instantiation as the root of the objects framework 108 and the root for the collection of application views (applView objects 202) in the IMS™ database 112. The application program 106 then provides the DL/I™ query string to an "evaluate" method of the applView object 202. The applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" method of the applView object 202 reads the DL/I™ query string and sets a pointer in the iterator object 210 to point to the collection of BOs 206 and DOs 208 that meet the DL/I™ segment search criteria.

A "next" method of the iterator object 210 is invoked to instantiate each BO 206 and/or DO 208 from the database 112, wherein the resulting state data of the BO 206 and DO 208 are cached in the memory of the server computer 104. Using the pointer and "next" method of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" methods associated for each class attribute. The application program 106 can then retrieve or update the attributes of a DO 208 by invoking these methods. Preferably, no I/O operations are performed at the invocation of these "get" and "set" methods, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using methods of the BOs 206. The BO 206 will, in turn, invoke methods of its corresponding DO 208 to perform the actual DL/I™ calls.

The following methods exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS ( )

UpdateToDS( )

InsertToDS( )

DeleteFromDS ( )

In a preferred embodiment, only the above four methods will result in actual I/O operations on the database 112.

Example Application Program

Following is a sample object-oriented application program 106 according to the present invention:

```
// application program
main ()
}
    // instantiate desired applView object (and DL/I object if necessary)
    applView_SSM applView ("applViewName");
    // instantiate iterator object and set pointer using applView object's
    // "evaluate" method and query string
    iterator* ltr=applView.evaluate (queryString);
    // use "next" method to instantiate a BO and its associated DO
    BO*pObj=ltr - > next ();
    // use indicated methods to retrieve, update, or
    // delete BOs and DOs
    pObj - > RetrieveFromDS();
    pObj - > UpdateToDS();
    pObj - > DeleteFromDS();
    // use "new Object" method to instantiate new DO
    DO*pObj=ltr - > new Object();
```

```
        -continued

// use indicated method to insert new DO
      pObj - > InsertToDS();
}
```

Following is a example DL/I™ query string that could be used by the objectoriented application program 106 that accesses the database 112:
   SELECT doClassNameC
   FROM databaseViewName
   WHERE doClassNameA.keyname relop keyvalue,
     doClassNameB.keyname relop keyvalue,
     doClassNameC.keyname relop keyvalue
where "relop" is a relational operator, such as:
   EQ or = or =
   GT or > or >
   LT or < or <
   GE or >= or =>
   LE or <= or =<
   NE or != or =!
   AND or & or *
   OR or | or +

Logic of the Objects Framework

Figure 3:
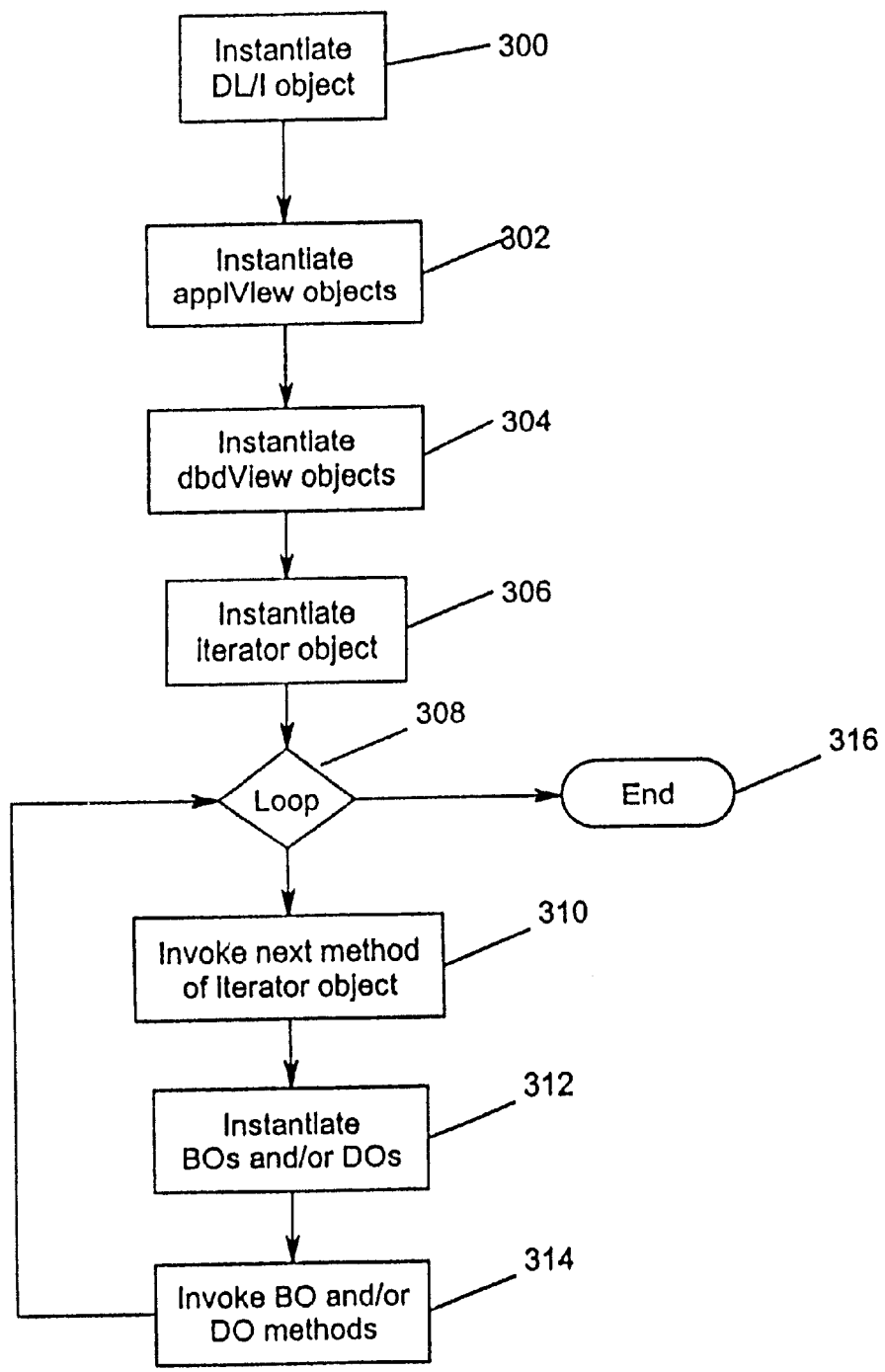
FIG. 3 is a flowchart illustrating the steps performed by the application program and objects framework according to the present invention.

FIG. 3 is a flowchart illustrating the steps performed by the application program 106 and objects framework 108 according to the present invention.

Block 300 represents the DL/I™ object 200 of the objects framework 108 being instantiated in the memory of the server computer 102. Usually, this occurs either when the objects framework 108 is loaded or when the application program 106 first requests an applView object 202.

Block 302 represents the application program 106 instantiating the requested applView object 202 in the memory of the server computer 102.

Block 304 represents the dbdView objects 204 of the objects framework 108 being instantiated in the memory of the server computer 102. Usually, this occurs either when the objects framework 108 is loaded or when the application program 106 first requests an applView object 202.

Block 306 represents the application program 106 instantiating the iterator object 210 in the memory of the server computer 102 and setting its object pointer by invoking the "evaluate" method with a DL/I™ query string.

Blocks 308–316 represent a loop that may be performed by the application program 108 to iterate through all the associated BOs 206 and/or DOs 208 in the collection.

Block 310 represents the application program 106 invoking the "next" member function or method of the iterator object 210 to instantiate/materialize the next DO 208 and/or BO 206 in the memory of the server computer 102.

Block 312 represents the iterator object 210 instantiating the requested DO 208 and/or BO 206 in the memory of the server computer 102.

Block 314 represents the application program 106 invoking the "getter", "setter", or other methods of the DOs 208 and/or BOs 206 to perform the desired functionality. Thereafter, control transfers back to Block 308.

Block 316 represents the end of the logic.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases or datastores.

In summary, the present invention discloses a method, apparatus, and article of manufacture for accessing a database, wherein the database is modeled as an objects framework. The database is modeled as an objects framework having zero or more business objects and one or more data objects. The data objects represent data in the database and the business objects represent logic for operating on the data objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accessing a hierarchical database, comprising:
   (a) modeling the hierarchical database into an objects framework that provides a layered processing model, wherein the objects framework comprises:
     (1) zero or more data objects representing data in the hierarchical database;
     (2) one or more business objects representing logic for operating on the data objects;
     (3) one or more database definition view objects that represent a structure and layout for the hierarchical database and manage a collection of the data objects and business objects;
     (4) one or more application view objects that represent an application view of the hierarchical database and manage a collection of the database definition view objects;
     (5) a root object that represents a root of the objects framework and manages a collection of the application view objects;
       wherein the root object, application view objects, database definition view objects, data objects, and business objects are organized into a tree structure to represent a hierarchical structure of data retrieved from the hierarchical database; and
   (b) accessing the hierarchical database through the objects framework.

2. The method of claim 1, wherein the objects framework comprises a class library that interfaces to an application program.

3. The method of claim 1, wherein an application program dynamically loads the business objects and data objects into the objects framework to access the hierarchical database during execution time.

4. The method of claim 1, wherein the data object provides a direct mapping of the data within each segment occurrence.

5. The method of claim 1, further comprising accessing data in the segment occurrence by interacting with the data object.

6. The method of claim 1, further comprising isolating the business object from specifics of the hierarchical database by invoking methods of the data object.

7. The method of claim 1, further comprising retrieving the data objects and/or business objects in response to a query.

8. The method of claim 7, further comprising incrementally materializing the data objects and/or business objects in a memory of a computer that satisfy search criteria of the query.

9. The method of claim 8, wherein the objects framework further comprises an iterator object that points to the incrementally materialized data objects and business objects.

10. The method of claim 9, further comprising instantiating additional data objects and business objects via the iterator object.

11. The method of claim 1, wherein the data object class represents a segment type in the database and the data object represents a segment occurrence in the database.

12. The method of claim 1, further comprising the step of accessing the business logic of the business object to invoke methods of the data object.

13. A computerized apparatus for accessing a hierarchical database, comprising:
   (a) means for modeling the hierarchical database into an objects framework that provides a layered processing model, wherein the objects framework comprises:
      (1) zero or more data objects representing data in the hierarchical database;
      (2) one or more business objects representing logic for operating on the data objects;
      (3) one or more database definition view objects that represent a structure and layout for the hierarchical database and manage a collection of the data objects and business objects;
      (4) one or more application view objects that represent an application view of the hierarchical database and manage a collection of the database definition view objects; and
      (5) a root object that represents a root of the objects framework and manages a collection of application view objects;
         wherein the root object, application view objects, database definition view objects, data objects, and business objects are organized into a tree structure to represent a hierarchical structure of data retrieved from the hierarchical database; and
   (b) means for accessing the hierarchical database through the objects framework.

14. The apparatus of claim 13, wherein the objects framework comprises a class library that interfaces to an application program.

15. The apparatus of claim 13, further comprising means for dynamically loading the business objects and data objects into the objects framework to access the hierarchical database during execution time.

16. The apparatus of claim 13, wherein the data object provides a direct mapping of the data within each segment occurrence.

17. The apparatus of claim 13, further comprising means for accessing data in the segment occurrence by interacting with the data object.

18. The apparatus of claim 13, further comprising means for isolating the business object from specifics of the hierarchical database by invoking methods of the data object.

19. The apparatus of claim 13, further comprising means for retrieving the data objects and/or business objects in response to a query.

20. The apparatus of claim 19, further comprising means for incrementally materializing the data objects and/or business objects in a memory of a computer that satisfy search criteria of the query.

21. The apparatus of claim 20, wherein the objects framework further comprises an iterator object that points to the incrementally materialized data objects and business objects.

22. The apparatus of claim 21, further comprising means for instantiating additional data objects and business objects via the iterator object.

23. The apparatus of claim 13, wherein the data object class represents a segment type in the database and the data object represents a segment occurrence in the database.

24. The apparatus of claim 13, further comprising means for accessing the business logic of the business object to invoke methods of the data object.

25. A program storage medium readable by a computer, the medium embodying one or more instructions executable by the computer to perform a method for accessing a hierarchical database, the method comprising:
   (a) modeling the hierarchical database into an objects framework that provides a layered processing model, wherein the objects framework comprises:
      (1) zero or more data objects representing data in the hierarchical database;
      (2) one or more business objects representing logic for operating on the data objects;
      (3) one or more database definition view objects that represent a structure and layout for the hierarchical database and manage a collection of the data objects and business objects;
      (4) one or more application view objects that represent an application view of the hierarchical database and manage a collection of the database definition view objects; and
      (5) a root object that represents a root of the objects framework and manages a collection of the application view objects;
         wherein the root object, application view objects, database definition view objects, data objects, and business objects are organized into a tree structure to represent a hierarchical structure of data retrieved from the hierarchical database; and
   (b) accessing the hierarchical database through the objects framework.

26. The program storage medium of claim 25, wherein the objects framework comprises a class library that interfaces to an application program.

27. The program storage medium of claim 25, the method further comprising dynamically loading the business objects and data objects into the objects framework to access the hierarchical database during execution time.

28. The program storage medium of claim 25, wherein the data object provides a direct mapping of the data within each segment occurrence.

29. The program storage medium of claim 25, the method further comprising accessing data in the segment occurrence by interacting with the data object.

30. The program storage medium of claim 25, the method further comprising isolating the business object from specifics of the hierarchical database by invoking methods of the data object.

31. The program storage medium of claim 25, the method further comprising retrieving the data objects and/or business objects in response to a query.

32. The program storage medium of claim 31, the method further comprising incrementally materializing the data objects and/or business objects in a memory of a computer that satisfy search criteria of the query.

33. The program storage medium of claim 32, wherein the objects framework further comprises an iterator object that points to the incrementally materialized data objects and business objects.

34. The program storage medium of claim 33, the method further comprising instantiating additional data objects and business objects via the iterator object.

35. The program storage medium of claim 25, wherein the data object class represents a segment type in the database and the data object represents a segment occurrence in the database.

36. The program storage medium of claim 25, further comprising the step of accessing the business logic of the business object to invoke methods of the data object.

* * * * *

UNITED STATES PATENT AND TRADEMARK OFFICE
CERTIFICATE OF CORRECTION

| | | |
|---|---|---|
| PATENT NO. | : 6,360,229 B2 | Page 1 of 2 |
| APPLICATION NO. | : 09/070274 | |
| DATED | : March 19, 2002 | |
| INVENTOR(S) | : Kenneth Ray Blackman, Shyh-Mei Fang Ho and Thomas Beavers Sander | |

It is certified that error appears in the above-identified patent and that said Letters Patent is hereby corrected as shown below:

Column 10
Line 65, after "the", insert --one or more--; after "and" insert --one or more--.

Column 11
Lines 1, 5, 9, 11, 14, 59, 62, 67, before "data" insert --one or more--.
Lines 1, 6, 9, 62, 67, "object" should read --objects--.
Lines 2, 63, "provides" should read --provide--.
Line 2, before "segment" insert --each occurrence of a--.
Line 3, delete "occurrence".
Lutes 5, 63, 66, before "segment" insert --occurrence of a--; after "segment" delete "occurrence".
Lines 8, 11, 14, 59, before "business" insert --one or more--.
Line 17, before "incrementally" insert --one or more--.
Line 20, before "additional" insert --an--; "objects" should read --object-- (both occurrences).

Column 12
Lines 2, 5, 8, 57, 67, before "business" insert --one or more--.
Lines 2, 3, 61, 65, 67, "object" should read --objects--.
Lines 3, 5, 8, 58, 62 (first occurrence only), 65, before "data" insert --one or more--.
Line 13, before "incrementally" insert --one or more--.
Line 16, insert --an-- before "additional"; (both occurrences) "objects" should read --object--.
Line 61, "provides" should read --provide--.
Line 63, before "segment" insert --occurrence of a--; after "segment" delete "occurrence."
Line 64, "the" should read --an--; before "segment" insert --occurrence of a--; after "segment" delete "occurrence."

Column 13
Lines 2, 4, 7, before "data" insert --one or more--.
Line 2, "subject" should read --subjects---.
Lines 4, 8, before "business" insert --one or more--.
Line 12, before "incrementally" insert --one or more--.

UNITED STATES PATENT AND TRADEMARK OFFICE
CERTIFICATE OF CORRECTION

PATENT NO. : 6,360,229 B2
APPLICATION NO. : 09/070274
DATED : March 19, 2002
INVENTOR(S) : Kenneth Ray Blackman, Shyh-Mei Fang Ho and Thomas Beavers Sander It is certified that error appears in the above-identified patent and that said Letters Patent is hereby corrected as shown below:

Column 14
Line 2, before "additional" insert --an---.
Lines 2, 3,"objects" should read --object--.

Signed and Sealed this

Twenty-third Day of October, 2007

JON W. DUDAS
*Director of the United States Patent and Trademark Office*